(12) United States Patent
Welle et al.

(10) Patent No.: US 12,135,231 B2
(45) Date of Patent: Nov. 5, 2024

(54) FILL LEVEL RADAR WITH VARIABLE QUANTIZATION ACCURACY

(71) Applicant: VEGA Grieshaber KG, Wolfach (DE)

(72) Inventors: Roland Welle, Hausach (DE); Samuel Kleiser, Gengenbach (DE)

(73) Assignee: VEGA Grieshaber KG, Wolfach (DE)

( * ) Notice: Subject to any disclaimer, the term of this patent is extended or adjusted under 35 U.S.C. 154(b) by 337 days.

(21) Appl. No.: 17/834,408

(22) Filed: Jun. 7, 2022

(65) Prior Publication Data

US 2022/0390265 A1 Dec. 8, 2022

(30) Foreign Application Priority Data

Jun. 7, 2021 (EP) ..................................... 21178038

(51) Int. Cl.
*G01F 23/284* (2006.01)

(52) U.S. Cl.
CPC .................................. *G01F 23/284* (2013.01)

(58) Field of Classification Search
CPC ........... G01F 23/284; G01S 13/88; G01S 7/41
See application file for complete search history.

(56) References Cited

U.S. PATENT DOCUMENTS

| 5,323,361 A | 6/1994 | Elle et al. |
| 5,587,969 A | 12/1996 | Kroemer et al. |
| 5,969,664 A | 10/1999 | Bedford et al. |
| 5,969,666 A * | 10/1999 | Burger ................. G01S 7/411 342/124 |
| 8,130,139 B2 * | 3/2012 | Taylor .................... G01S 13/88 342/124 |

(Continued)

FOREIGN PATENT DOCUMENTS

| CN | 103502782 A | 1/2014 |
| CN | 104520682 A | 4/2015 |

(Continued)

OTHER PUBLICATIONS

Extended European Search Report issued Nov. 17, 2021 in European Patent Application No. 21178038.2 (with English Translation of Category of Cited Documents), 9 pages.

(Continued)

*Primary Examiner* — Olumide Ajibade Akonai
*Assistant Examiner* — Yonghong Li
(74) *Attorney, Agent, or Firm* — Oblon, McClelland, Maier & Neustadt, L.L.P.

(57) ABSTRACT

A method of adjusting a quantization accuracy of a fill level radar for detecting a fill level of a container is provided, the method including the steps of: acquiring amplitude values of an echo curve of the fill level radar by an analog-to-digital converter (ADC); determining a first amplitude value of a first echo having a highest amplitude or a highest local amplitude maximum of the echo curve; determining a second amplitude value of a second echo having a lowest local amplitude maximum of the echo curve; setting an adjusted quantization accuracy as a function of a quotient of the first amplitude value and the second amplitude value; and determining the fill level of the container with the adjusted quantization accuracy. A field device including a fill level radar and/or an ultrasonic measuring device configured to perform the method is also provided.

13 Claims, 8 Drawing Sheets

(56) References Cited

U.S. PATENT DOCUMENTS

| | | | |
|---|---|---|---|
| 8,730,093 B2* | 5/2014 | Edvardsson | G01S 13/26 |
| | | | 342/124 |
| 8,776,594 B2 | 7/2014 | Welle et al. | |
| 10,948,333 B2 | 3/2021 | Welle et al. | |
| 11,015,969 B2 | 5/2021 | Welle et al. | |
| 2010/0223019 A1* | 9/2010 | Griessbaum | G01F 23/2962 |
| | | | 342/124 |

FOREIGN PATENT DOCUMENTS

| | | |
|---|---|---|
| CN | 105102941 A | 11/2015 |
| CN | 112763023 A | 5/2021 |
| DE | 43 08 373 A1 | 9/1994 |
| DE | 102 49 544 A1 | 5/2004 |
| EP | 0 573 034 A2 | 12/1993 |
| EP | 0 882 956 A2 | 12/1998 |
| EP | 2 116 819 A1 | 11/2009 |
| EP | 2 418 465 A1 | 2/2012 |
| EP | 3 401 651 A1 | 11/2018 |
| EP | 3 418 700 A1 | 12/2018 |

OTHER PUBLICATIONS

Chinese Office Action mailed on Jul. 24, 2024, issued in Chinese Patent Application No. 202210634027.0, with English Translation, total 9 pages, citing documents 15-19, therein.

* cited by examiner

FILL LEVEL RADAR WITH VARIABLE QUANTIZATION ACCURACY

CROSS-REFERENCE TO RELATED APPLICATIONS

This application claims the benefit of priority under 35 U.S.C. § 119 to European Patent Application No. 21 178 038.2, filed on 7 Jun. 2021, the entire content of which is incorporated herein by reference.

FIELD

The invention relates to a method for adjusting a quantization accuracy of a fill level radar or an ultrasonic measuring device. The invention further relates to a field device, a program element, a computer readable medium, and a use.

BACKGROUND

Fill level radar devices measure a distance to a product by means of a sensor system based on an evaluation of the propagation time of radar signals and/or ultrasonic signals emitted. Because the fill level radar devices are in at least some cases field devices, e.g., autonomous field devices, the energy consumption of the sensor technology and/or further components of the field device may be crucial. Thus, a measure that reduces the energy consumption of the field device in at least some situations is desirable.

SUMMARY

It is a task of the invention to reduce the energy consumption of the field device in at least some situations. This task is solved by the subject matter of the independent patent claims. Further embodiments of the invention result from the sub-claims and the following description.

One aspect relates to a method for adjusting a quantization accuracy of a fill level radar for detecting a level of a container, comprising the steps of: acquisition of amplitude values of an echo curve of the fill level radar by means of an analog-digital converter (ADC); determining a first amplitude value of a first echo having a highest amplitude or a highest local amplitude maximum of the echo curve; determining a second amplitude value of a second echo having a lowest local amplitude maximum of the echo curve; and setting an adjusted quantization accuracy as a function of a quotient of the first amplitude value and the second amplitude value to determine a fill level of a container with the adjusted quantization accuracy.

In this context, a quantization accuracy is understood to be a "maximum resolution" and/or an "(effective) measurement accuracy" of the sensor system and/or the measuring device. The quantization accuracy can thus relate, for example, to the sensor system, a processing path, a transmission path, and/or further components of the measuring device. The sensor system may, for example, be implemented as a fill level radar using a pulse transit time method and/or a continuous wave radar method. The sensor technology may be used, for example, to measure a level and/or to determine a topology of a product. For example, the sensor technology may be an ultrasonic measurement device. Although aspects of the ultrasonic measuring device are no longer explicitly mentioned below, the following also applies, in a suitably adapted manner, to ultrasonic measuring devices. The measuring device may be implemented as a field device, in particular as an autonomous field device.

The measuring device may, for example, be arranged in a container, for example a vessel or a measuring tank of any shape, or also on or above a channel, for example above a stream or river bed.

The sensing device comprises at least one analog-to-digital converter (ADC). The ADC may have a predefined and/or set sampling accuracy or quantization accuracy, such as 14 bits or any other resolution. The sampling accuracy may be fixed or adjustable. The ADC may sample values from the sensor—i.e., the echo signals—directly, or may sample values from the sensor "indirectly" using one or more intermediate stages, such as generating an intermediate frequency. The frequency of measurements may depend on a rate of level change, i.e., if the level changes frequently, more frequent measurement may be appropriate.

The echo signals consist of a sequence of amplitude values, where in many cases the amplitude values are plotted as ordinates (e.g., in dB, decibels, or in V, volts) over a distance or a scanning time (distance d, or time t, as abscissa) from the antenna. Local maxima of the amplitude values may be caused by reflections from the product, e.g., from the product surface, from installations in the vessel, from the antenna (e.g., when using a horn antenna) and/or by reflections from other objects in or on the vessel. Local maxima of amplitude values are often referred to as "echoes". If the container has a greater depth, for example several meters, then the echo—due to the long distance to be traversed—from a bottom of the container may be particularly weak, i.e., have a particularly low amplitude value, and/or a higher transmission energy may be required to obtain a (well) measurable echo. An amplitude value of an echo having a highest amplitude of the echo curve may be several orders of magnitude higher than an amplitude value of an echo having a lowest local amplitude maximum of the echo curve. An ADC may have a resolution or quantization accuracy by which it is possible to distinguish the lowest local amplitude maximum from a "noise floor" of the echo signals—generated, for example, by diffuse reflections from the vessel walls, from the sensor system and/or otherwise.

The first amplitude value of the first echo may have a highest amplitude of the echo curve. In this case, the highest amplitude may be generated, for example, by the antenna, e.g., by the walls of a horn antenna, because these signals are reflected by a particularly close reflection object and therefore—due to the short distance travelled—have only a low attenuation. The first amplitude value of the first echo may have a highest local amplitude maximum of the echo curve. The highest local amplitude maximum may be a highest "useful" amplitude maximum, such as the highest reasonably measurable level. In one embodiment, the highest local amplitude maximum may be selected as a "reference point" and thus an "overshoot" may be accepted when measuring the highest amplitude of the echo curve. The second amplitude value of the second echo may correspond to the lowest "useful" or "productive" amplitude of the echo curve.

Thus, the adjusted quantization accuracy may be set as a function of a quotient of the first amplitude value and the second amplitude value. The following measurements and/or evaluations may be performed with this adjusted quantization accuracy. In this context, the quantization accuracy may be adjusted or reduced at several points, for example by changing the resolution of the ADC and/or during the calculation in the processor, during the transmission of the measured values and/or at further points or at further components of the measuring device. The adjusted quantization accuracy may be set after each measurement, after a (e.g., predefined) number of measurements and/or as a function of a change in the quotient of the first amplitude value and the second amplitude value.

Advantageously, the method can thus be particularly suitable for adapting a quantization accuracy to a measurement situation. In particular, a balance can thereby be achieved between an "accurate" sampling, i.e., with high resolution or high quantization accuracy, and a low processing rate (e.g., in the processor) and/or transmission rate, e.g., in a wired and/or wireless communication unit. By such adaptation or adjustment, the energy consumption of the field device—or of a plurality of components of the field device—in determining the level of a container, may be reduced in at least some situations. For example, the operating time of the high-frequency circuitry can thereby be kept as short as possible and/or the transmission time of the measured values may be reduced. Because years of evaluation have shown that fast rates of level change are typical, especially for small containers, this automated setting of the adjusted quantization accuracy may have a particularly impressive balance between an adjusted quantization accuracy—which may have a low resolution in this measurement situation—and a high measurement rate (which becomes possible because of a lower power consumption and/or a shorter quantization time).

In one embodiment, the amplitude values are acquired with a maximum quantization accuracy of the ADC. In this case, the quantization accuracy is only reduced in a register, e.g., of the processor or of an intermediate memory. For this embodiment, it is advantageous to use ADCs that have the same quantization accuracy for each measurement.

In one embodiment, the acquisition of the echo curve is performed with the adjusted quantization accuracy of the last adjustment of the ADC. In doing so, the quantization time may be reduced for at least some ADCs. This may be particularly advantageous if only short distances to the product surface are covered by the radar signal. Here, a memory may contain the sampling accuracy of the last measurement. The memory may optionally include a history of the sampling accuracy to make the measurement more robust.

In some embodiments, a processing path and/or a transmission path is operated with the adjusted quantization accuracy. The processing path may comprise, for example, a processor and/or a control unit of the field device. The transmission path may be, for example, wired and/or wireless. This can further reduce the power consumption of the field device.

In some embodiments, the transmission path may be wired and/or wireless. For example, protocols such as the HART protocol (HART: Highway Addressable Remote Transducer), the IO-Link interface, Ethernet-based protocols such as Ethernet-APL (Ethernet Advanced Physical Layer), and/or wireless protocols such as a Wireless Personal Area Network (WPAN), Wireless LAN (WLAN), and/or a Low power wide area network (LPWAN) may be supported.

In some embodiments, the adjusted quantization accuracy is a logarithmical function of the quotient of the first amplitude value and the second amplitude value. The function may include a safety margin, such that advantageously a clear separation between the lowest local amplitude maximum of the echo curve and the "noise floor" of the echo signals is possible.

In some embodiments, the adjusted quantization accuracy is a function of a distance between a number of leading zeros of the first amplitude value and a number of leading zeros of the second amplitude value. This allows for a particularly fast determination of the quotient, especially for processors that support bit instructions.

In some embodiments, the acquisition of the echo curve by means of a first ADC and a second ADC (and/or further ADCs) is performed alternately in time. In this case, the ADCs alternate in sampling the measured values (interleaving). In the case of more than two ADCs, this may be done, for example, in a ring-wise manner. This may be particularly advantageous in the event of a rapid change in the level.

In some embodiments, the ADC (or ADCs) capture an intermediate frequency signal having amplitude values of the echo curve of the fill level radar. This may contribute to an easier processing of the measured values because the intermediate frequency signal may have a lower and/or constant base frequency. Further processing of this digital representation may subsequently be performed by a microprocessor.

In some embodiments, the fill level radar uses a pulse transit time method and/or a continuous wave radar method. In this case, in level measuring instruments using the pulse transit time method, temporally short high-frequency pulses are generated by a transmitting oscillator, emitted with the aid of a transmitting antenna in the direction of a product, reflected at the product and the reflected signals or echoes are received again by the measuring instrument, i.e., by a receiving antenna (which may be the same as the transmitting antenna). For further evaluation of the signals, one or more intermediate stage(s) may be used, which may include, for example, the generation of a (lower frequency) intermediate frequency signal.

In fill level measuring devices using the continuous wave radar method or FMCW method (FMCW: frequency modulated continuous wave radar), a frequency modulated high-frequency signal is generated by a voltage controlled oscillator (VCO: voltage controlled oscillator), which can change the frequency by means of an applied voltage, and emitted via a transmitting antenna of the measuring instrument in the direction of the product to be measured. After reflection of the radar signals at the product, these echoes are received by a receiving antenna (which may be the same as the transmitting antenna) of the measuring instrument. For further evaluation of the signals, one or more intermediate stage(s) may be used, which may include, for example, a high-frequency mixer which mixes the echo signals with a portion of the transmitted signal currently generated by the VCO, which is decoupled via a high-frequency coupler. The resulting low-frequency differential analog signal may have frequency components which are directly dependent on the time offset between the transmitted signal and the currently generated signal, and hence on the transit time of the radar signal from the sensor to the reflector and back. For further processing of the acquired analog signal, in particular using a spectral analysis, this may be converted into a digital representation with an ADC and fed to a microprocessor for further evaluation.

One aspect relates to a field device comprising a fill level radar and/or an ultrasonic measurement device adapted to perform a method as described above and/or below.

One aspect relates to a use of a field device as described above and/or below for measuring a level and/or determining a topology of a product. This may be performed, for example, in a container, a flume or a stockpile.

One aspect relates to a program element which, when executed on a computing unit of a field device and/or on another computing unit, instructs the computing unit to perform the method as described above and/or below.

One aspect relates to a computer-readable medium on which the program element described herein is stored.

It should also be noted that the various embodiments may be combined with each other.

BRIEF DESCRIPTION OF THE FIGURES

For further clarification, the invention is described with reference to embodiments illustrated in the figures. These embodiments are to be understood as examples only and not as limitations.

The figures depict.

DETAILED DESCRIPTION OF EMBODIMENTS

Some of the embodiments shown illustrate aspects of the present invention using a radar measuring device operating according to a pulse transit time method. The described applies, in a transferred manner, also to radar measuring devices operating according to the FMCW principle and/or to ultrasonic measuring devices.

Figure 1A:
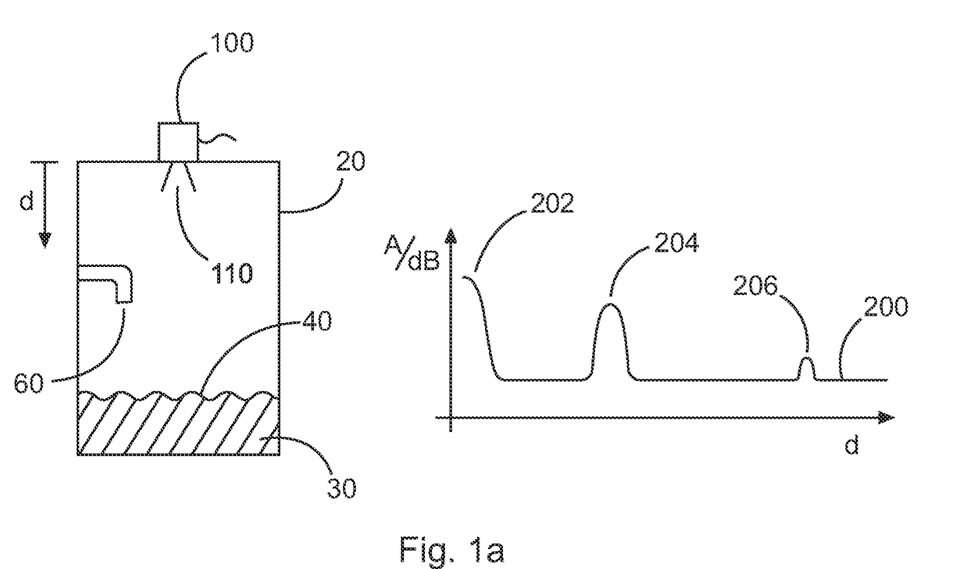
FIG. 1a schematically shows a measurement according to an embodiment with an almost empty container.

FIG. 1a schematically shows a measurement according to one embodiment in the case of an almost empty container 20. In this case, a level measuring device 100, with the aid of a high-frequency circuit, records an echo curve 200 in the case of the almost empty container 20, which echo curve 200 reflects the strength or amplitude values of reflected signals (y-axis) as a function of the respective distance d (x-axis). In the case of sensors according to the pulse transit time method, the echo curve 200 may be tapped directly at the output of the radio frequency module or also after analog preprocessing—for example by filtering, rectification, amplification, and/or logarithmization—and fed to an analog-to-digital converter (ADC). In the case of sensors using the FMCW method, in many cases a high-frequency module provides an analog low-frequency frequency mixture (IF signal) representing the individual reflections, which can also be filtered, amplified, and fed to the ADC as an echo curve 200.

The echo curve 200 has a highest amplitude or first large echo 202 generated by reflections from the antenna 110 (e.g., horn antenna) of the measurement device 100. In addition, the echo curve 200 has a highest local amplitude maximum or echo 204 produced by reflections of radio frequency signals from a container installation 60, and a lowest local amplitude maximum or echo 206 produced by reflections from a surface 40 of a product or filling material 30. At least some echo curve evaluation algorithms may require the complete echo curve 200 to be able to recognize that the echo 206 is caused by the product surface 40, and the echo 206 may be used to determine the distance d to the surface 40 of the product 30. When the container 20 is nearly empty, the product echo 206 may have a very low amplitude. At the same time, the echo 204 from the container 60 located in close proximity to the measuring device 100 and acting as a reflector may have a very high amplitude of echo 204. This may result in the need to perform a conversion of the echo curve 200 into a digital representation with a very high accuracy, which allows the relatively small amplitude of the filling material echo 206 to be safely digitally resolved and further processed. Consequently, the measuring device 100, in particular the ADC integrated in the measuring device 100, must be operated with a very high quantization accuracy—i.e., a fine amplitude quantization—for example with a first quantization of 14 bits. The slowing down of the radar measurement associated with this setting, in order to be able to transmit the data quantity in the direction of a processor system with the aid of one or more serial interfaces, may—if cleverly designed—not have a negative effect for the application illustrated by way of example if short reaction times are not required when the container is almost empty.

Figure 1B:
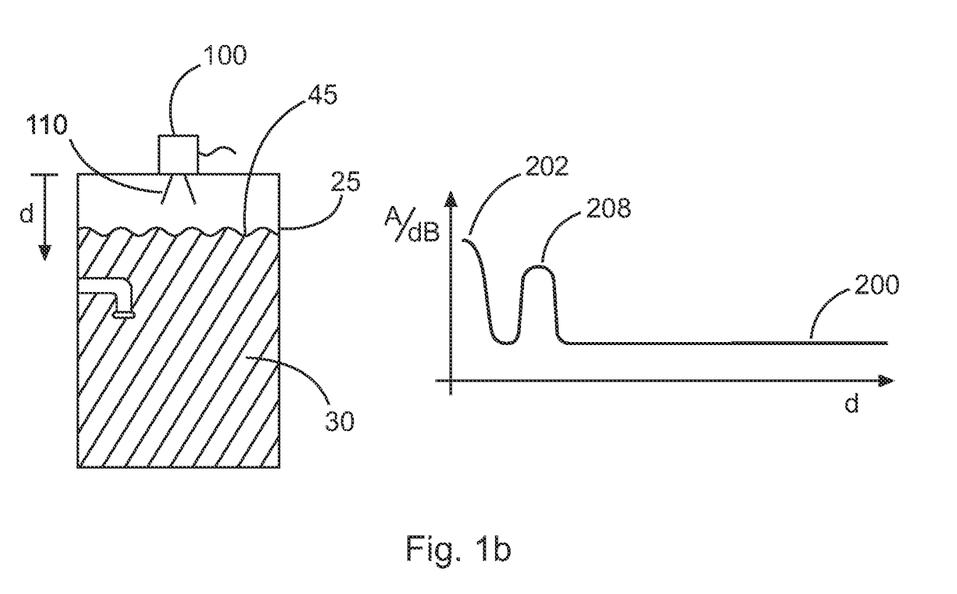
FIG. 1b schematically shows a measurement according to an embodiment with a nearly filled container.

FIG. 1b schematically shows a measurement according to one embodiment with a nearly filled container 25, where, for example due to a risk of overfilling the container 25, very fast measurement cycles may be expected from the level measuring device 100. The measuring device 100, in particular the processor integrated in the measuring device, can control the ADC for detecting the echo curve 200 in such a way that the echo curve 200 is determined, for example, with a second (coarser) quantization accuracy of 12 bits. The reduction in data associated with this setting may allow both the determination of individual data points and their transmission to a processor system to be accelerated, thereby gaining a degree of freedom to increase the measurement repetition rate. At the same time, from knowledge of the application, it may be ensured that no information is lost with this reduction in bit width. This is because, when the container 25 is full, potential reflectors—for example, the surface 45 of a product 30—may all be in close proximity to the level measurement device 100; this generates echoes 208 with a high local amplitude maximum, which may be reliably detected even if the bit width is reduced during analog-to-digital (A/D) conversion.

Figure 2:
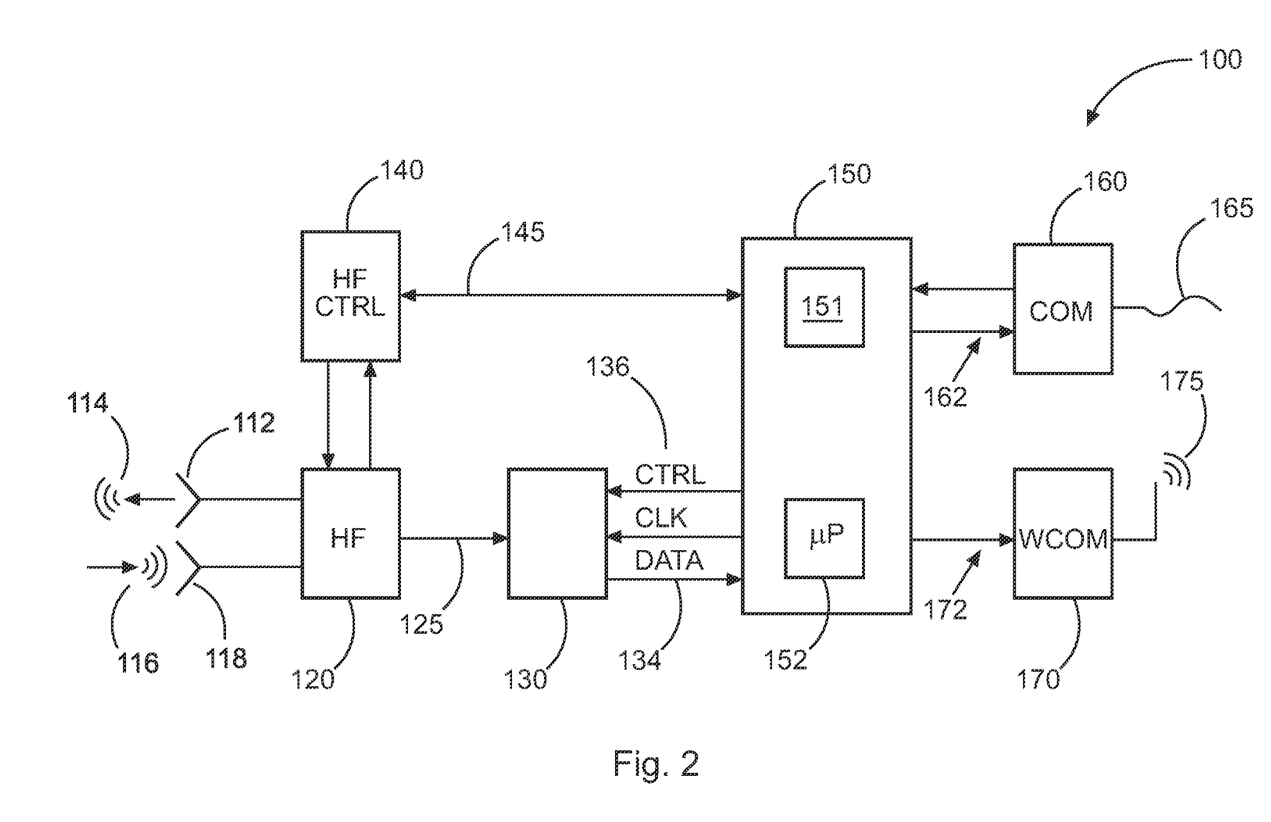
FIG. 2 schematically shows an internal structure of a radar level meter according to an embodiment.

FIG. 2 schematically shows an internal structure of a radar level meter 100 according to one embodiment. A high-frequency circuit 120 located in the device 100 generates a high-frequency signal 114 which is radiated via an antenna 112 in the direction of a product surface 40, 45 (see FIGS. 1a, 1b). The signal components 116 reflected by the product surface 40, 45 and other reflectors 60 are received by a receiving antenna 118 and forwarded to the high-frequency circuit 120, within which the detected signals 116 are converted into a lower-frequency range (intermediate frequency, IF frequency), in particular according to a pulse transit time method or an FMCW method. The high-frequency circuit 120 is controlled in the shown embodiment execution example by a control circuit 140, which may include, for example, a difference frequency control or a fractional integer phase locked loop (PLL) control. The high-frequency circuit 120 may be controlled by the control circuit 140, which may be digitally provided by a processor 150 via a control line 145. In particular, this may control an operating time of the high-frequency circuit 120—which may have a high energy requirement—and thereby reduce the energy requirement thereof. During the acquisition of the echo signals 116, the high-frequency circuit 120 provides a low-frequency representation (e.g., an IF signal) which is acquired by an ADC 130 and converted into a digital representation. The quantization accuracy or the accuracy of the conversion, i.e., the bit width, resolution, or width of a quantization stage in the acquisition of the amplitude values of the analog echo trace 200 may be specified by the processor 150 via a control line 136. The selection of an appropriate quantization accuracy may be performed, for example, by a quantization stage determination device 152 integrated in the processor, such as by hardware and/or software set up for this purpose. The radar system 100 may be powered, for example, by a two-wire interface 165 or a three-wire interface 165. Further, this interface may be used by a communication module 160 to transmit level values in analog or digital form. Alternatively or additionally, provision may be made to provide measured values to the outside world via a wireless communication module 170, by means of a communication antenna 175. The quantization level determination device 152 may take into account predefinable or automatically determined application information according to the principle of FIGS. 1a, 1b for determining an appropriate quantization level. Alternatively or additionally, other criteria may be used, for example as set forth below.

FIGS. 3a to 3f schematically show effects of adjusting a different quantization accuracy according to one embodiment. The echo curves 310, 320, 330, 340, 350, 360 may be—generated, for example, during a transition of a low-frequency echo curve 200 provided by an RF circuit 120.

Figures 3A, 3B, 3C:
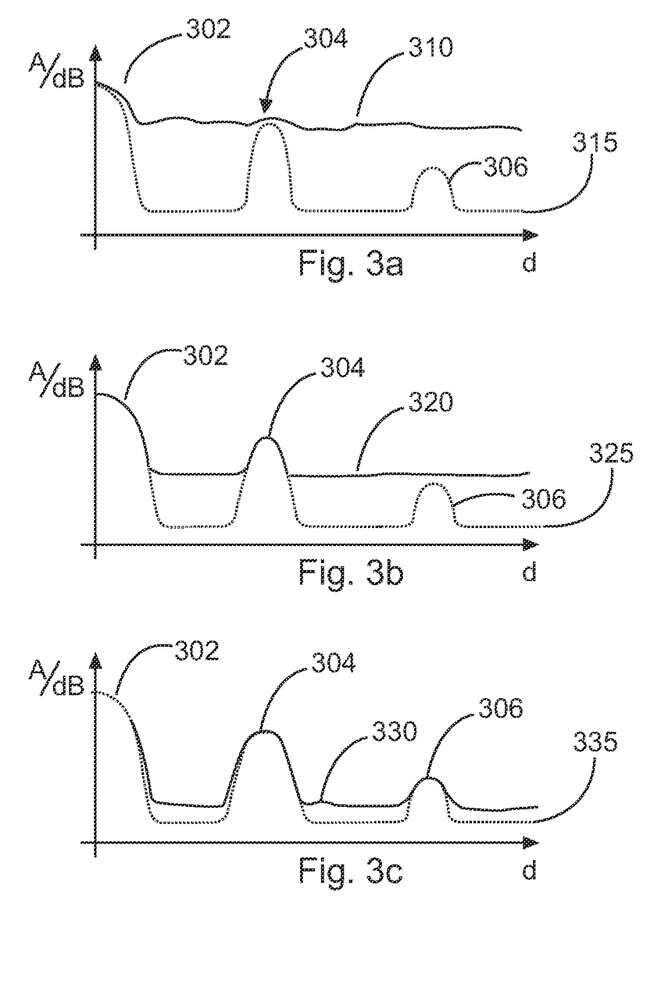
FIGS. 3a to 3f schematically show the effects of adjusting a different quantization accuracy according to one embodiment.

The digitized echo curve 310 of FIG. 3a is generated by the ADC 130 (see, for example, FIG. 2) from the analog echo curve 200 (see FIG. 1a) with a first accuracy k, for example an amplitude resolution of k=10 bits. The echo curve 200 is shown dotted as echo curve 315, or in FIGS. 3b to 3f as dotted echo curves 325, 335, 345, 355, 365. It may be clearly seen that neither the echo 304 nor the echo 306 of echo curve 315 are mapped in the digital echo curve 310. Operation of the measuring device with an amplitude resolution of k=10 bits therefore leads to erroneous measurements and is therefore not reasonably possible in a measuring situation as shown in FIG. 1a. If the same analog echo curve 200, as shown in FIG. 3b, with a second quantization accuracy m, for example an amplitude resolution of m=12 bits, is converted into a digital representation 320, the echo 304 may be well resolved, where against the actual level echo 306 of echo curve 325 still cannot be detected due to its low amplitude. For the measurement situation of the almost full container 20, it may therefore be necessary to control the ADC 130 via the quantization level determination device 152 in such a way that the ADC 130 detects the digital representation 330 of the echo curve 360 with a third quantization accuracy n, for example with n=14 bits, as shown in FIG. 3c. In this way, all relevant echoes 304, 306 may be reliably acquired and/or further processed.

Figures 3D, 3E, 3F:
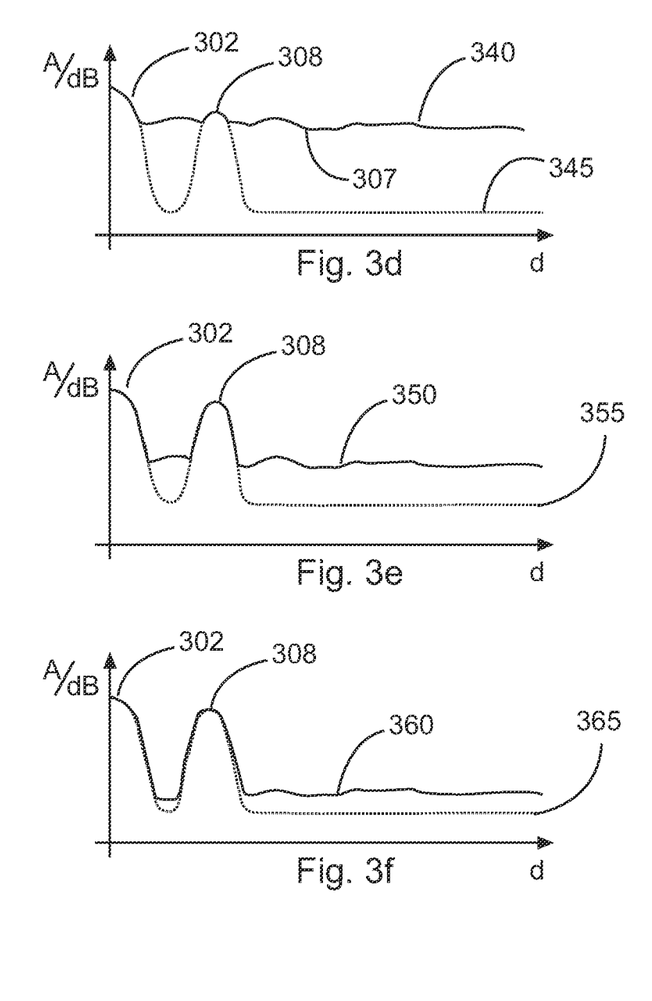

In another measuring situation, for example with a nearly filled container 25 (see FIG. 1b), the measuring device 100 may behave differently. An echo curve 340 digitized with a first amplitude resolution of k=10 bits, as shown in FIG. 3d, may already correctly resolve the filling material echo 308. To increase reliability, it may be complementary to require a larger signal-to-noise ratio for the filler echo 308, where the noise may be defined by the quantization during A/D conversion. At a second amplitude resolution of m=12 bits, see curve 350 in FIG. 3e, a very reliable measurement of the filling material echo 308 may be made on the basis of the digitized echo curve 350. A further increase in the accuracy of the A/D conversion to n=14 bits, as underlying the curve 360 in FIG. 3f, does not generate any additional information. Therefore, this finer resolution of the amplitude may be dispensed with in the measurement situation of FIG. 1b. This may result in a reduction of the energy requirement.

The reduction of the bit width and thus of the accuracy of the A/D conversion may reduce the amount of data which is transmitted to a processor 150 via one or more interfaces 134. In addition, the conversion of an analog voltage value into a digital measured value may be performed more quickly in terms of time with a reduced bit width, in particular in the case of inexpensive SAR (SAR: successive approximation register) ADCs. It is therefore an embodiment of the present invention to also adjust the sampling frequency of the ADC when the quantization stage is changed.

Figure 4:
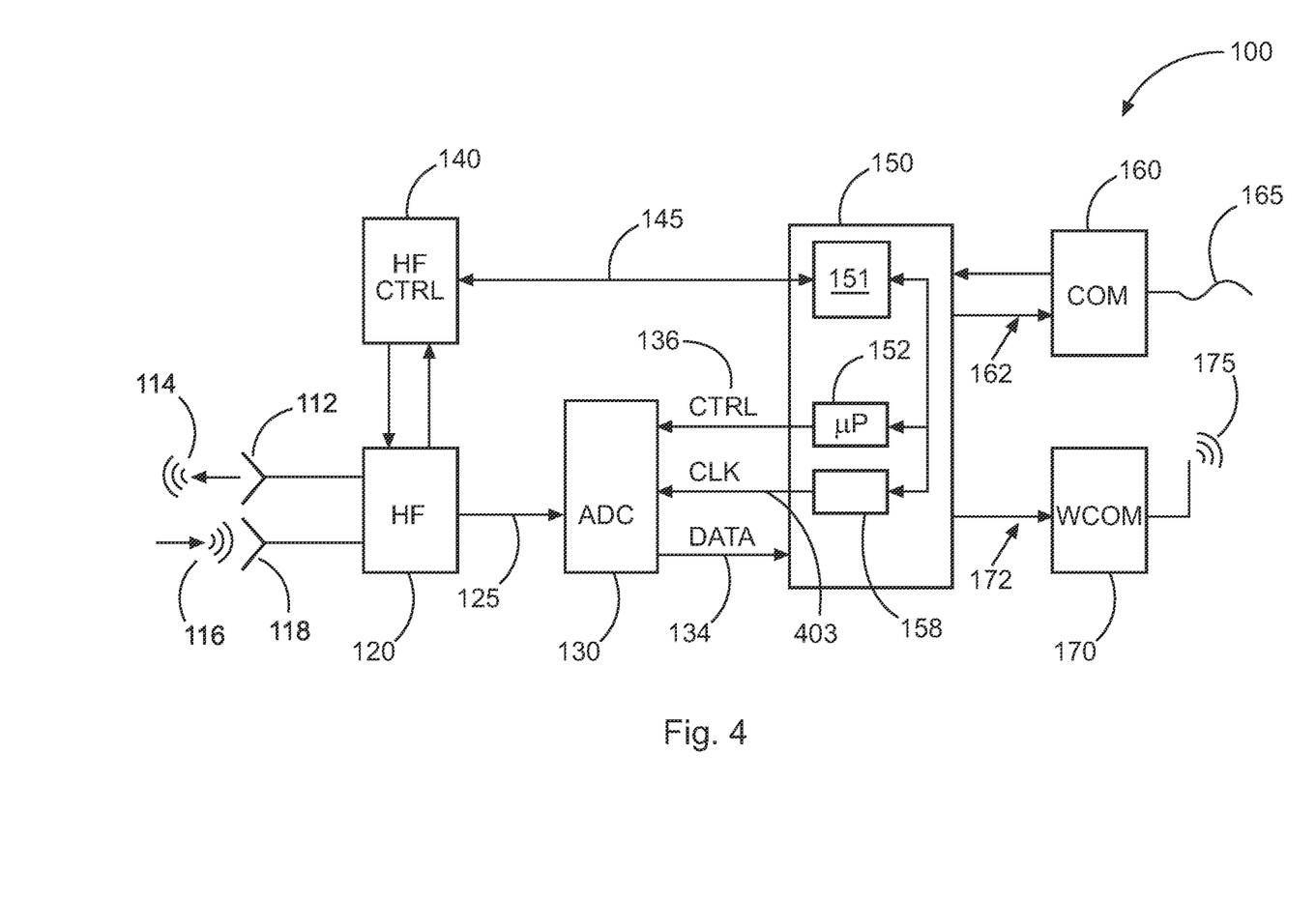
FIG. 4 schematically shows an internal structure of a radar level meter according to a further embodiment.

FIG. 4 schematically shows an internal structure of a radar level meter 100 according to another embodiment. If a new adjusted quantization accuracy is specified by the quantization stage determination device 152, this information may be passed to a sampling clock determination device 158 within which, taking into account the structure and performance characteristics of the ADC 130, a new sampling frequency is determined which is transmitted to the ADC 130 via a clock line 403. Hereby, it may be achieved that the reduced duration of the measurement significantly reduces the operating time of the ADC 130, thereby saving energy. Supplementally, it may be provided to transmit the information about a changed sampling frequency to a high-frequency parameter determination device—151. This is arranged to determine and transmit to the control circuit 140 new parameters—suitable for the new sampling frequency, for example in order to further reduce the operating time of the high-frequency circuit 120, and thereby also the energy consumption. For example, in a radar apparatus according to a pulse transit time method, the device 151 may re-determine the difference frequency between a transmitting oscillator and an internal reference oscillator and transmit it to the control circuit 140. In particular, for a radar device according to an FMCW method, the start frequency, the end frequency, the number of steps during a measurement and/or the slope of the frequency sweep may be determined by the determining device 151 and transmitted to the control circuit.

It should be noted here that the ADC 130 may be an inherent part of the processor system 150. In particular, it may be provided that the processor system 150 comprises an ADC 130 fixedly embedded on its semiconductor substrate.

Figure 5:
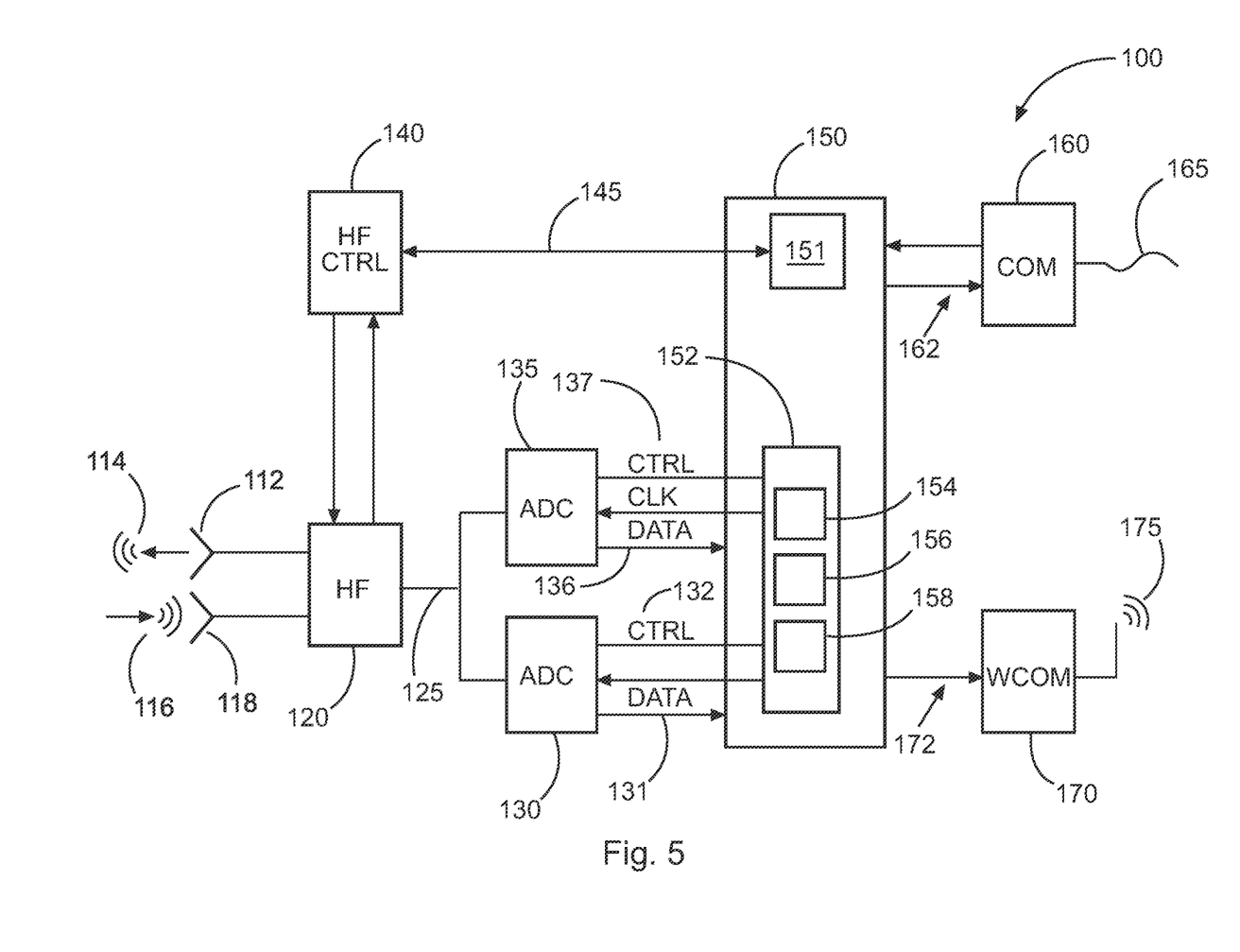
FIG. 5 schematically shows an internal structure of a radar level meter according to a further embodiment.

FIG. 5 schematically shows an internal structure of a radar level meter 100 according to a further embodiment. Here, the idea of a quantization-dependent increase of the sampling frequency is further continued by adding a second ADC 135. If the maximum sampling frequency and/or the maximum transmission rate of a first ADC 130 is not sufficient to achieve a clock rate provided by the sampling clock determination device, a second ADC 135 may be alternately added (in an interleave mode) to the ADC 130 to acquire data, and thus the sampling frequency may be further increased and the operating time of the high-frequency circuit 120 may be further reduced. To this end, the processor 150 includes a converter con troll device 156 adapted to drive a plurality of ADCs 130, 135. For this purpose, the converter control device 156 includes a sampling clock determining device 158, which is arranged to determine a sampling clock suitable therefor on the basis of a necessary quantization determined by the quantization level determining device 152. If, during this determination, it becomes necessary to set a higher sampling clock than would be possible with the primary ADC 130, the control device 156 activates the secondary ADC 135, and provides sampling clocks to both this ADC 135 and the primary ADC 130 in such a way that alternate conversion of the echo curve in one of the two ADCs takes place according to an interleave scheme. This allows the resulting sampling frequency to be further increased compared to the embodiment example of FIG. 4.

Figure 6:
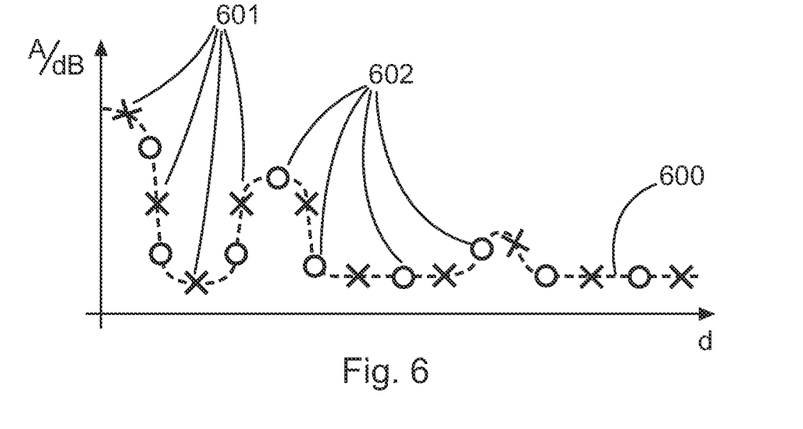
FIG. 6 schematically shows the sampling of an echo curve with two ADCs according to one embodiment.

The merging of the data provided by the ADCs 130, 135 is performed in a sorting unit 154 according to the scheme of FIG. 6. The samples "X" 601 of the echo curve 600 provided by the primary ADC 130 are arranged alternately with the samples "O" 602 provided by the secondary ADC 135 by a rearrangement in the memory of the processor. The samples "X" 601 and "O" 602 may be used to compose the resulting echo curve 600, which may be further processed according to known methods. It should be noted in this regard that, depending on the requirements of the measurement situation, it may additionally be provided to control the primary ADC and/or the secondary ADC by means of suitable control signals with respect to the accuracy or quantisation level required for converting the echo curve 200 into its digital representation 330. Furthermore, it may be provided to deactivate the secondary ADC 135 again when the predetermined sampling frequency may be independently realized by a primary ADC 130 at a predetermined amplitude resolution.

In addition—with reference to, but without limitation to, the embodiment example of FIG. 5—it should be noted that the primary ADC 130 and/or the secondary ADC 135 may be inherent components of the processor system 150. In particular, it may be envisaged that the processor system 150 comprises a plurality of ADCs 130, 135 fixedly embedded on its semiconductor substrate.

It may also be provided to drive a primary ADC 130 and a secondary ADC 135 with clock signals such that they determine their respective samples 601, 602 at the same times. By numerically determining the mean value of simultaneously determined samples in the processor 150, the amplitude resolution can thereby be computationally increased beyond the resolution technically provided by a single ADC.

In a further embodiment, it may further be provided to permanently and/or situationally add a third ADC (or additional ADCs) for sensing in an interleave mode, and thus further increase the sampling frequency and further reduce the operating time of the high-frequency circuit 120. This may be an external ADC, or it may be an ADC permanently embedded on the semiconductor substrate of the processor system 150.

As explained above, the quantization level determination device 152 may use prescribable or automatically determined application information to determine an appropriate quantization level. Alternatively or additionally, provision may be made to consider characteristics of the components used in the radar measurement device 100, in particular the ADC 130. For at least some ADCs, their accuracy may depend on the required sampling frequency and/or the ambient temperature present during sampling. If, for example, a temperature measurement carried out in the device shows that the required accuracy can no longer be achieved with a primary ADC 130 at the respectively prevailing ambient temperature due to temperature-dependent component tolerances, the addition of a secondary ADC 135 and clock-synchronous control with subsequent averaging can ensure the required quantization accuracy or amplitude resolution in the A/D conversion even at high temperatures. With reference to the example of implementation in FIG. 5, it is also possible to halve the sampling rate to be set in a single ADC approximately or exactly by adding a further ADC, and thus to increase the accuracy of the conversion. It may also be provided to take into account aging effects of the installed components when setting the quantization, the sampling frequency and/or the number of ADCs to be used. Furthermore, it is possible to operate the ADCs with a modified quantization accuracy at predefinable time intervals in order to cyclically verify their reliability in the environment of safety-critical applications. These aspects can also be further implemented with the addition of a third ADC (or even further ADCs).

Figure 7:
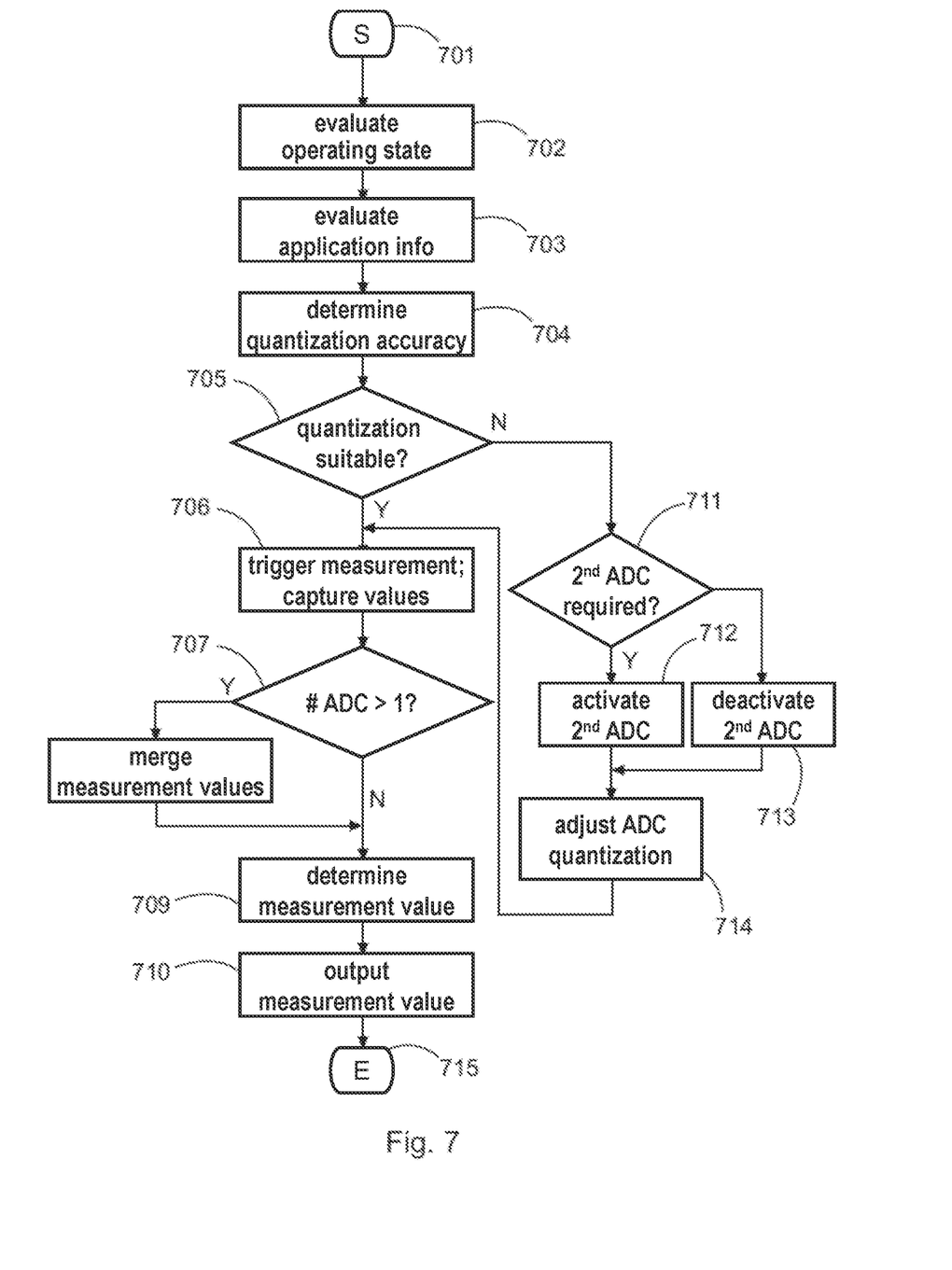
FIG. 7 is a flowchart showing a method according to one embodiment.

FIG. 7 shows a flow diagram 700 with a method according to one embodiment. In particular, the flow diagram 700 shows a sequence during a first operating phase and during a second operating phase of the radar measuring device, with the sequence shown being run through again with each new measuring cycle. The process begins in a start state 701. In a step 702, the current operating state of the level measuring device is evaluated. Here, in particular, information such as the last determined measured value, the last existing amplitude ratios of the echoes of an echo curve, the currently available energy, the ambient temperature and/or the age of the level measuring device may be determined. In a step 703, the information about the application is determined and evaluated. In particular, specifications of the user regarding the application situation, such as the measuring range or the reflectivity of the medium or also the installation situation of the sensor, may be determined here. The information compiled in steps 702 and 703 is used in a step 704 by a quantization level determination device 152 to determine the currently adapted quantization accuracy in an A/D conversion of the echo curve. In a step 705, it is checked whether the ADC 130 is already suitably set for measurement with the adjusted quantization accuracy. If not, a step 711 first checks whether the desired accuracy requires the use of a secondary ADC 135. If this is required, the secondary ADC 135 is enabled in a step 712. Otherwise, it is deactivated in a step 713. In a subsequent method step 714, the ADCs 130, 135 are adjusted to the required accuracy by providing appropriately executed drive signals. In a step 706, the high-frequency circuit 120 is activated to trigger a measurement and convert the provided analog echo signals or echo curves 200 into their digital representation. After the measurement is completed, a step 707 verifies whether the measurement data had been provided by a single ADC 130. If this is not the case, in a step 708 the measured values 601 of the primary ADC 130 and the measured values 602 of the secondary ADC 135 are merged in a memory, for example of a processor of the field device. Subsequently, in a step 709, the level measurement value is determined based on the digital representation of the echo curve 200 and provided to the outside world in an analog and/or digital manner via wired communication interfaces 165 or wireless interfaces 175 in a step 710. The method ends in a state 715.

Figure 8:
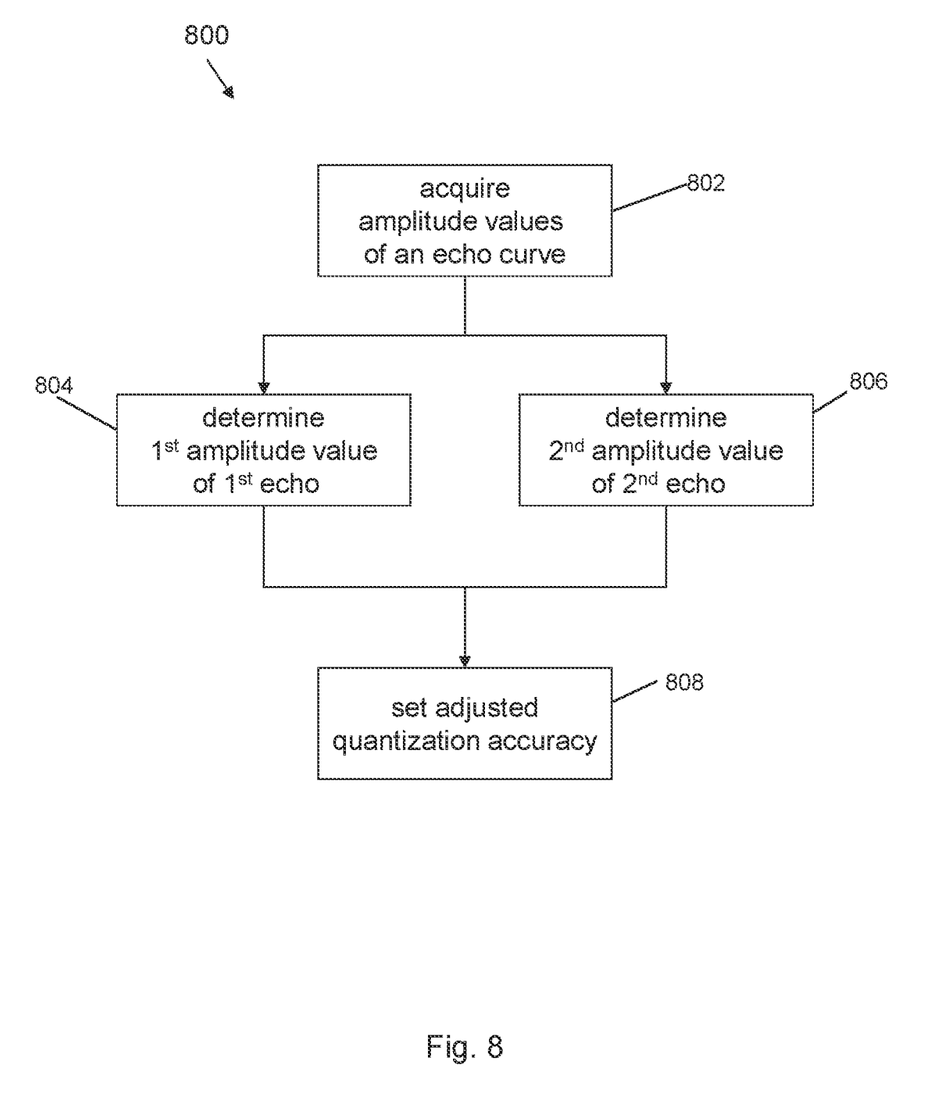
FIG. 8 is a flowchart showing a method according to a further embodiment.

FIG. 8 shows a flowchart 800 with a method according to a further embodiment. In a step 802, amplitude values of an echo curve 200 (see, e.g., FIGS. 1*a*, 1*b*) of the fill level radar are acquired using an ADC. In a step 804, a first amplitude value of a first echo having a highest amplitude or a highest local amplitude maximum of the echo curve is determined. In a step 806 performed before, after, or in parallel with the step 804, a second amplitude value of a second echo having a lowest local amplitude maximum of the echo curve is determined. In a step 808, an adjusted quantization accuracy is set as a function of a quotient of the first amplitude value and the second amplitude value.

LIST OF REFERENCE SIGNS

20 Almost empty container
25 Nearly filled container
30 Fill goods
40 Filling surface of the almost empty container
45 Product surface of the nearly filled container
60 Vessel installation, reflectors
100 Fill level measuring device, fill level radar
110 Antenna
112 Transmitting antenna
114 High-frequency signals
116 Echo signals
118 Receiving antenna
120 High-frequency circuit
130 Analog-to-digital converter (ADC)
134 Interfaces
135 further ADC, analog-digital converter
136 Control line
140 Control circuit
145 Control line
150 Processor, processor system
151 High-frequency parameter determination device
152 Quantization stage determination device
154 Sorting unit
156 Transducer control device
158 Sampling clock determination device
160 Communication module
165 Communication interfaces, e.g. two-wire interface
170 Wireless communication module
175 Communication antenna
200 Echo curve
202, 204, 206, 208 Echoes
302, 304, 306, 308 Echoes
310-360 Echo curves
315-365 Echo curves
403 Clock line
600 Echo curve
601 Sampling values X
602 Sampling values O
700 Flow diagram
701-715 Steps
800 Flow diagram
802-808 steps

The invention claimed is:

1. A method of adjusting a quantization accuracy of a fill level radar and/or an ultrasonic measuring device for detecting a fill level of a container, the method comprising the steps of:
acquiring amplitude values of an echo curve of the fill level radar and/or the ultrasonic measuring device by means of an analog-to-digital converter (ADC);
determining a first amplitude value of a first echo having a highest amplitude or a highest local amplitude maximum of the echo curve;
determining a second amplitude value of a second echo having a lowest local amplitude maximum of the echo curve;
setting an adjusted quantization accuracy as a function of a quotient of the first amplitude value and the second amplitude value; and
determining the fill level of the container with the adjusted quantization accuracy.

2. The method according to claim 1, wherein the acquiring of the amplitude values of the echo curve is performed with a maximum quantization accuracy of the ADC.

3. The method according to claim 1, wherein the acquiring of the amplitude values of the echo curve is performed with the adjusted quantization accuracy of a last adjustment of the ADC.

4. The method according to claim 1, wherein a processing path and/or a transmission path is operated with the adjusted quantization accuracy.

5. The method according to claim 4, wherein the transmission path is wired and/or is wireless.

6. The method according to claim 1, where the adjusted quantization accuracy is a logarithmic function of the quotient.

7. The method according to claim 1, wherein the adjusted quantization accuracy is a function of a distance between a number of leading zeros of the first amplitude value and a number of leading zeros of the second amplitude value.

8. The method according to claim 1, wherein the acquiring of the amplitude values of the echo curve is performed alternately in time by means of a first ADC and a second ADC.

9. The method according to claim 1, wherein the ADC detects an intermediate frequency signal having amplitude values of the echo curve of the fill level radar and/or the ultrasonic measuring device.

10. The method according to claim 1, wherein the fill level radar uses a pulse transit time method or a continuous wave radar method.

11. A field device, comprising a fill level radar and/or an ultrasonic measuring device configured to perform a method according to claim 1.

12. The field device according to claim 11, wherein the field device is configured to measure a level and/or determine a topology of a product.

13. A non-transitory computer-readable storage medium comprising computer program instructions stored therein, which, when executed on a processor of a field device and/or on another processor, instructs the field device to perform a method according to claim 1.

* * * * *